United States Patent
Park et al.

(10) Patent No.: US 9,455,947 B2
(45) Date of Patent: Sep. 27, 2016

(54) APPARATUS AND METHOD OF ENABLING TO TRANSCEIVE DATA USING A PLURALITY OF HETEROGENEOUS NETWORKS SELECTIVELY THROUGH A FIXED HOST ADDRESS

(75) Inventors: Jin Soo Park, Seoul (KR); Sang Kug Yi, Gwangju-si (KR); Soon Uk Kim, Anyang-si (KR); Seung Jun Lee, Seoul (KR)

(73) Assignee: AIRPLUG INC., Seoul (KR)

( * ) Notice: Subject to any disclaimer, the term of this patent is extended or adjusted under 35 U.S.C. 154(b) by 361 days.

(21) Appl. No.: 14/130,227

(22) PCT Filed: Jul. 5, 2012

(86) PCT No.: PCT/KR2012/005330
§ 371 (c)(1),
(2), (4) Date: Dec. 30, 2013

(87) PCT Pub. No.: WO2013/005996
PCT Pub. Date: Jan. 10, 2013

(65) Prior Publication Data
US 2014/0149603 A1    May 29, 2014

(30) Foreign Application Priority Data
Jul. 6, 2011  (KR) .................. 10-2011-0066981

(51) Int. Cl.
*H04L 29/12* (2006.01)
*H04W 48/18* (2009.01)
(Continued)

(52) U.S. Cl.
CPC .......... *H04L 61/10* (2013.01); *H04L 61/6077* (2013.01); *H04L 67/02* (2013.01);
(Continued)

(58) Field of Classification Search
CPC  H04W 48/18; H04W 92/10; H04L 61/2007; H04L 67/02; H04L 69/162; H04L 61/6077; H04L 69/18; H04L 61/6063; H04L 61/6013; H04L 61/10
See application file for complete search history.

(56) References Cited

U.S. PATENT DOCUMENTS

2010/0215019 A1 * 8/2010 Velev .................... H04W 8/06
370/331
2011/0314129 A1 * 12/2011 Rezaiifar ............ H04W 76/025
709/218

FOREIGN PATENT DOCUMENTS

JP    2002-335278 A    11/2002
JP    2003-288288 A    10/2003
(Continued)

OTHER PUBLICATIONS

International Search Report mailed Jan. 14, 2013 for PCT/KR2012/005330.

*Primary Examiner* — Kim T Nguyen
(74) *Attorney, Agent, or Firm* — Hauptman Ham, LLP

(57) ABSTRACT

The mobile communication terminal capable of accessing to a plurality of heterogeneous networks selectively, according to the present invention, comprises a process which communicates data with an application running on the mobile communication terminal, through a local socket created with its destination address set to a fixed internal address; and another process which creates at least one outward socket by setting its source address to an IP address assigned from one of the plurality of heterogeneous networks and its destination address to a remote address, and communicates data with an outside server of the remote address through the at least one outward socket. Data communication is made between the local socket and the at least one outward socket if the at least one outward socket is set as associated with the local socket.

54 Claims, 14 Drawing Sheets

(51) Int. Cl.
  *H04L 29/08* (2006.01)
  *H04L 29/06* (2006.01)
  *H04W 92/10* (2009.01)

(52) U.S. Cl.
  CPC ............ *H04L 69/162* (2013.01); *H04L 69/18* (2013.01); *H04W 48/18* (2013.01); *H04W 92/10* (2013.01); *H04L 61/2007* (2013.01); *H04L 61/6013* (2013.01); *H04L 61/6063* (2013.01)

(56) References Cited

FOREIGN PATENT DOCUMENTS

| | | |
|---|---|---|
| JP | 2004-355511 A | 12/2004 |
| JP | 2007-265165 A | 10/2007 |
| JP | 2009021966 A | 1/2009 |
| KR | 10-2006-0063624 A | 6/2006 |
| KR | 10-2006-0070246 A | 6/2006 |
| KR | 102007-0040493 A | 4/2007 |
| WO | 2011075739 A1 | 6/2011 |

\* cited by examiner

APPARATUS AND METHOD OF ENABLING TO TRANSCEIVE DATA USING A PLURALITY OF HETEROGENEOUS NETWORKS SELECTIVELY THROUGH A FIXED HOST ADDRESS

CROSS REFERENCE TO RELATED APPLICATION

This application claims the priority of Korean Patent Application No 10-2011-0066981, filed on Jul. 6, 2011 in the Korean Patent and Trade Mark Office. Further, this application is the National Phase application of International Application No. PCT/KR2012/005330 filed on Jul. 5, 2012, which is incorporated herein by reference in its entirety.

TECHNICAL FIELD

This document relates to an apparatus and method of enabling to transceive data by using selectively a plurality of heterogeneous networks that are different in their properties such as the number of users, service coverage, and the quality of service, etc.

BACKGROUND ART

As wireless network technologies have made progress, people can surf on the Internet to find and discover information and download the contents such as files, songs, and videos, anytime, anywhere by using a variety of mobile communication terminal such as cellular phones, smartphones, and tablet computers.

As shown in FIG. 1, a user who uses a mobile communication terminal 10 capable of data communication to get data on a network, commonly sends/receives requests for the data, e.g., web page, to/from a web server 12a by using a browser 10a. During the course of reception of a web page from the web server 12a (S01), a socket is created by an operating system (OS) in request of the browser 10a, with its source address set to an access address, e.g., an IP address, which is allocated from a network 11 to which the mobile communication terminal 10 is connected, and with its destination address set to the web server 12a. A socket is a logical object indicating an endpoint of inter-process communication flow in a computer network, consisting of protocol, originating IP address and port number, and destination IP address and port number. Then, with the created socket, a socket-to-socket virtual connection, called a session, to the web server 12a is established through the network 11. The network 11 can be a cellular CDMA2000 or W-CDMA network, a high-speed local network, e.g., Wi-Fi network, or a different type network.

Once a content item in the web page received is chosen, a data send request, for example, a hyper-text transfer protocol (HTTP) request is sent, through a session established by the OS, as described above, to a content server 12b (S02). Upon reception of the HTTP request, the content server 12b sends an HTTP response, in download or streaming mode, to the mobile communication terminal 10 (S03). Once the HTTP response is received, an application, for example, player 10b is invoked that is associated with the content type specified in the multipurpose internet mail extensions (MIME) header in the HTTP response. Then, the content data contained in the HTTP response starts to be rendered by the application.

By the way, wireless network conditions often change with time and location, compared with wired networks. It is even more so for Wi-Fi networks which cover local areas only. Hence, changing network conditions may cause the mobile communication terminal 10 to be disconnected from the network 11, while the mobile communication terminal 10 is communicating with remote servers. If the network disconnection happens, the OS checks if there is a new network connectible, and if so, is assigned a new IP address from the network found. The socket, which was created with its source address set to the no-longer-valid IP address, gets useless, and thereby the applications sending/receiving data through the socket, e.g., the browser 10a or player 10b come to halt. In this case, after a new IP address has been assigned, the above-mentioned operations for a new connection such as socket and session creation are conducted again, by request of user after some interval or after being notified of a particular symbol displayed on display panel by the OS of the terminal 10. As a result, the content intended by the user is received.

DISCLOSURE

Technical Problem

It is an object of the present invention to provide an apparatus and method of providing a stable communication environment by using a plurality of heterogeneous networks, irrespective of disconnection or fluctuation in quality of service in one of the plurality of heterogeneous networks.

It is another object of the present invention to provide an apparatus and method of enabling applications to use a fixed access address in communicating data with a remote server while using a plurality of heterogeneous networks, notwithstanding disconnection to one of the plurality of heterogeneous networks.

It is a further object of the present invention to provide an apparatus and method of improving data reception speed by using a plurality of heterogeneous networks in parallel, in a cellular communication environment where network conditions often fluctuate.

It is another further object of the present invention to provide an apparatus and method of providing an optimal data service environment by selecting a single or more networks among a plurality of heterogeneous networks, based on information such as communication environment, amount of data being requested to send/receive, and user's data plan.

The scope of the present invention is not necessarily limited to the above explicit statements. Rather, the scope of the present invention covers anything to accomplish effects that could be derived from the below specific and illustrative explanations of the present invention.

Technical Solution

A mobile communication terminal capable of accessing to a plurality of heterogeneous networks according to one aspect of the present invention, comprises: an inward processing unit configured for communicating data with an application running on the mobile communication terminal through a local socket created in such a way that destination address thereof is set to an internal address; and an outward processing unit configured for creating at least one outward socket in such a way that source address thereof is set to an access address assigned from one of the plurality of heterogeneous networks and destination address thereof is set to a remote address, and for communicating data with an outside server of the remote address through the created at least one outward socket, wherein data communication is made between the local socket and the at least one outward socket if the at least one outward socket is set as associated with the local socket.

In one embodiment of the present invention, the local socket is created in response to a request for creating a socket whose destination address is set to the internal address, irrespective of destination address of a protocol-compliant request, e.g., an HTTP request to be sent to an arbitrary outside server, based on the internal address specified in a proxy configuration set in the mobile communication terminal. And, the proxy configuration may be set by execution of a process including the inward processing unit or the outward processing unit.

In another embodiment of the present invention, the local socket is created in response to a request for creating a socket whose destination address is set to the internal address specified in a redirection directive, which is received in response to a protocol-compliant request sent outwardly to an arbitrary outside server.

In still another embodiment of the present invention, the local socket is created in response to a request for creating a socket whose destination address is set to the internal address specified in an application running on the mobile communication terminal, wherein the request is made by the application irrespective of destination address of a protocol-compliant request to be sent to an arbitrary outside server. In this embodiment, the application inserts the internal address into a host field of the protocol-compliant request, and sends the internal address inserted protocol-compliant request to the inward processing unit through the local socket, and the inward processing unit removes the internal address inserted in the host field of the protocol-compliant request received from the application, and sends the internal address removed protocol-compliant request to the outward processing unit. In addition, the application is configured for sending protocol-compliant requests according to chosen items, selectively to the inward processing unit through the local socket.

In one embodiment of the present invention, the mobile communication terminal may further comprise a network selecting unit configured for selecting, among the plurality of heterogeneous networks, one or more networks over which a protocol-compliant request received through the local socket is transmitted, based on user's service charge plan or present conditions of one or more networks of the plurality of heterogeneous networks, and for notifying the selected one or more networks to the outward processing unit. In addition, the network selecting unit may be further configured for selecting one or more networks over which a protocol-compliant request received through the local socket is transmitted, based on data size intended to be received by the received protocol-compliant request, and for notifying the selected one or more networks to the outward processing unit. When network selection is notified from the network selecting unit, the outward processing unit creates an outward socket for using the selected one or more networks, or uses an existing outward socket already coupled to the selected one or more networks.

In one embodiment of the present invention, the mobile communication terminal may further comprise a buffer configured for storing temporarily a protocol-compliant request, which has been transmitted through the outward socket, to retransmit later, or a response to the protocol-compliant request in order to prepare a complete protocol-compliant response from the response.

In one embodiment of the present invention the outward processing unit is configured for: checking, if one network of the plurality of heterogeneous networks is stopped, whether or not there exists an usage-stopped outward socket created to use said one network; creating, if there exists, a new outward socket, whose source address is set to an access address assigned from another network of the plurality of heterogeneous networks and whose destination address is set to a server address specified in a protocol-compliant request, if the protocol-compliant request has been sent through the usage-stopped outward socket; associating the new outward socket with the local socket that is associated with the usage-stopped outward socket; and retransmitting the protocol-compliant request through the new outward socket, or transmitting through the new outward socket a new protocol-compliant request for demanding at least a part of data size intended to be received by the protocol-compliant request. In this embodiment, the outward processing unit may be further configured for: combining a first data contained in a response, e.g., HTTP response to the new protocol-compliant request with a second data that is already received through the usage-stopped outward socket, in such a way that the first data and the second data constitute a complete protocol-compliant response; and sending the complete protocol-response to the inward processing unit.

In one embodiment of the present invention, the outward processing unit is configured for: creating, in addition to a first outward socket created for using a first network of the plurality of heterogeneous networks, a second outward socket for using a second network, other than the first network, of the plurality of heterogeneous networks; creating a new protocol-compliant request for demanding at least a section of entire data, the entire data being intended to be received by an original protocol-compliant request transmitted through the first outward socket; transmitting the created new protocol-compliant request through the second outward socket, while preventing the section of the entire data from being received through the first outward socket; combining both protocol-compliant responses, which are received through the first outward socket and the second outward socket respectively, in such a way that said both protocol-compliant responses constitute a complete protocol-compliant response that is intended to be received as a response to the original protocol-compliant request; and sending the complete protocol-compliant response to the inward processing unit. In this embodiment, for preventing the section of the entire data from being received through the first outward socket, the outward processing unit either transmits, through the first outward socket, a request for not transmitting data of the section, or closes the first outward socket in the event that data of the section is received through the first outward socket.

In one embodiment of the present invention, the outward processing unit is configured for: dividing entire data into two or more distinct sections, the entire data being intended to be received by an original protocol-compliant request received through the local socket; creating protocol-compliant requests, each demanding each of the two or more distinct sections; creating a plurality of outward sockets for using two or more networks of the plurality of heterogeneous networks; transmitting the protocol-compliant requests through the created plurality of outward sockets in such a manner that the protocol-compliant requests are respectively distributed over said two or more networks; combining protocol-compliant responses, which are received through the plurality of outward sockets, in such a way that the protocol-compliant responses constitute a complete protocol-compliant response that is intended to be received as a response to the original protocol-compliant request; and sending the complete protocol-compliant response to the inward processing unit.

In one embodiment of the present invention, the internal address comprises a port number and a specific IP address that is publicly known as identifying an internal entity.

In one embodiment of the present invention, the local socket and the outward socket are a logical object through which data communication is made between local processes or between a local process and a remote process, the logical object including a type of protocol, IP address and port number of a source, and IP address and port number of a destination.

A mobile communication terminal capable of accessing to a plurality of heterogeneous networks according to another aspect of the present invention, comprises: a multiple access processing unit configured for communicating data with another application running on the mobile communication terminal through a local socket created in such a way that destination address thereof is set to an internal address, for creating at least one outward socket to be associated with the local socket, in such a way that source address thereof is set to an access address assigned from one of the plurality of heterogeneous networks and destination address thereof is set to a remote address, for communicating data with an outside server of the remote address through the created at least one outward socket, and for conducting data communication between the local socket and the at least one outward socket that is set as associated with the local socket; and a communication unit configured for transceiving signals of data to be communicated with the outside server of the remote address through the created at least one outward socket.

An apparatus equipped with a storage storing for programs according to another aspect of the present invention, comprises: communication means being capable of transceiving data through communication with an outside entity; and storing means storing an application to be run on a mobile communication terminal, the application being transmitted or received through the communication means, wherein the application includes a program structure to accomplish operations, in case of being run on the mobile communication terminal, that comprise: communicating data with another application running on the mobile communication terminal through a local socket created in such a way that destination address thereof is set to an internal address; creating at least one outward socket to be associated with the local socket, in such a way that source address thereof is set to an access address assigned from one of a plurality of heterogeneous networks and destination address thereof is set to a remote address, the plurality of heterogeneous networks being usable by the mobile communication terminal; communicating data with an outside server of the remote address through the created at least one outward socket; and conducting data communication between the local socket and the at least one outward socket that is set as associated with the local socket. The apparatus according to the present invention is a mobile communication terminal, or a remote server having contents or applications.

A method of enabling to transceive data by using a plurality of heterogeneous networks selectively in accordance with another aspect of the present invention, comprises: a first step of receiving, through a local socket created in such a way that destination address thereof is set to an internal address, a first data request, e.g., HTTP request whose destination address is an outside server; a second step of creating, according to the first data request, at least one outward socket to be associated with the local socket, in such a way that source address thereof is set to an access address assigned from one of the plurality of heterogeneous networks and destination address thereof is set to an address of the outside server, and transmitting a second data request through the created at least one outward socket; and a third step of transferring a response, through the local socket associated with one outward socket pertaining to the at least one outward socket, to an originator which made the first data request, the response being received through said one outward socket in answer to the transmitted second data request.

In one embodiment of the present invention, the second step transmits either the first data request or one or more new requests as the second data request wherein the one or more new requests are drawn from modifying requesting content of the first data request.

Advantageous Effects

The embodiments of the present invention, which are described above and will be described hereinafter in detail with reference to accompanying figures, enable applications running on the mobile communication terminal to communicate data with a remote server stably and smoothly, although an error of connection to a network to which the mobile communication terminal is connected happens, by having made the applications use a fixed host address, i.e., a local address, which is unaffected from the connection error, and coupling a new connection to another available network instead of an unavailable network.

Furthermore, the embodiments of the present invention make it possible for the applications to communicate with a remote server with a higher data transfer rate, by establishing multiple sockets on distinct heterogeneous networks through which data can be communicated simultaneously.

MODE FOR INVENTION

Hereinafter, embodiments of the present invention will be described in detail with reference to the accompanying drawings.

Figure 1:
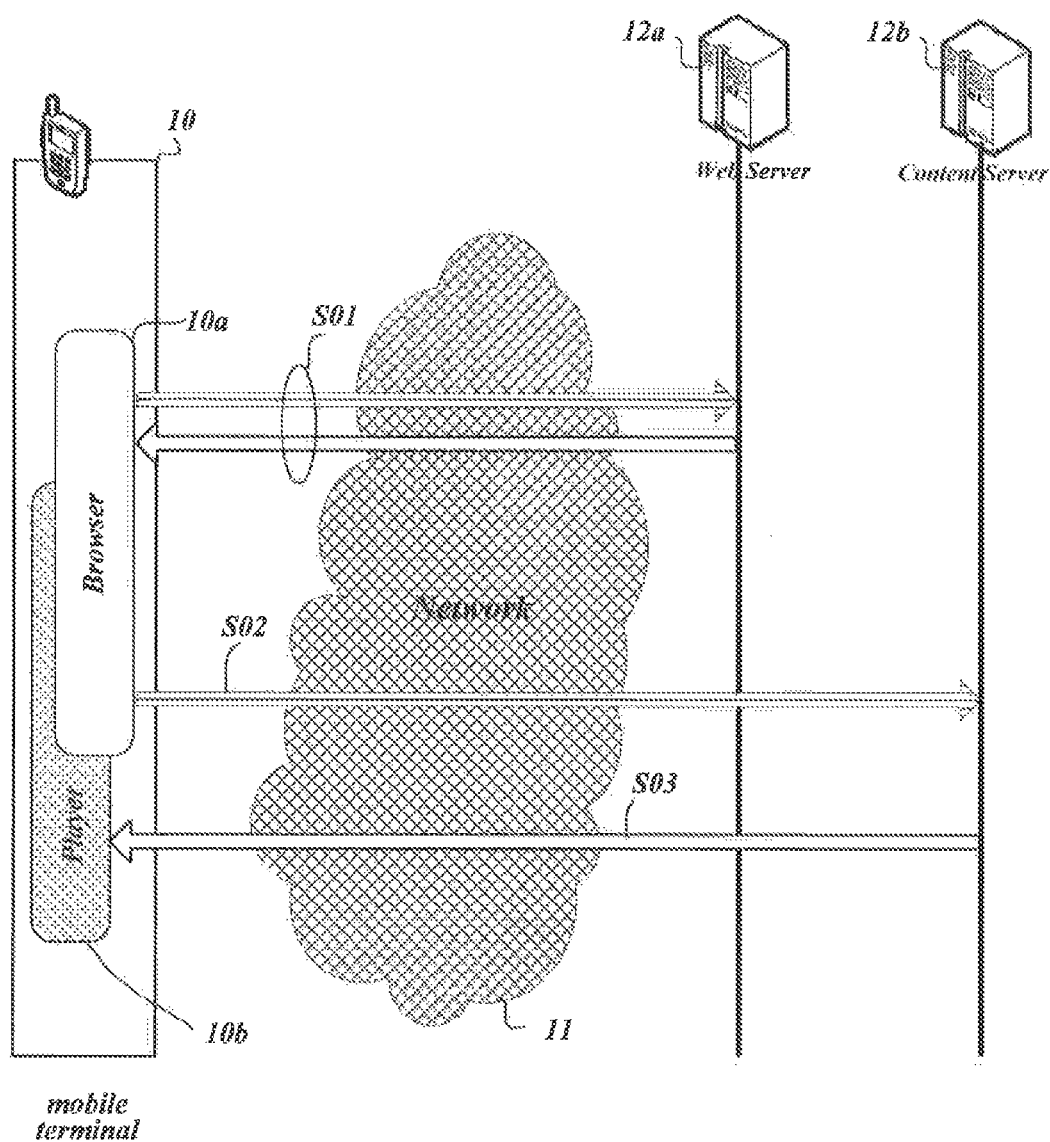
FIG. 1 is a diagram illustrating a general procedure of receiving response from a remote server through network by request of applications running on a mobile communication terminal.
Figure 2:
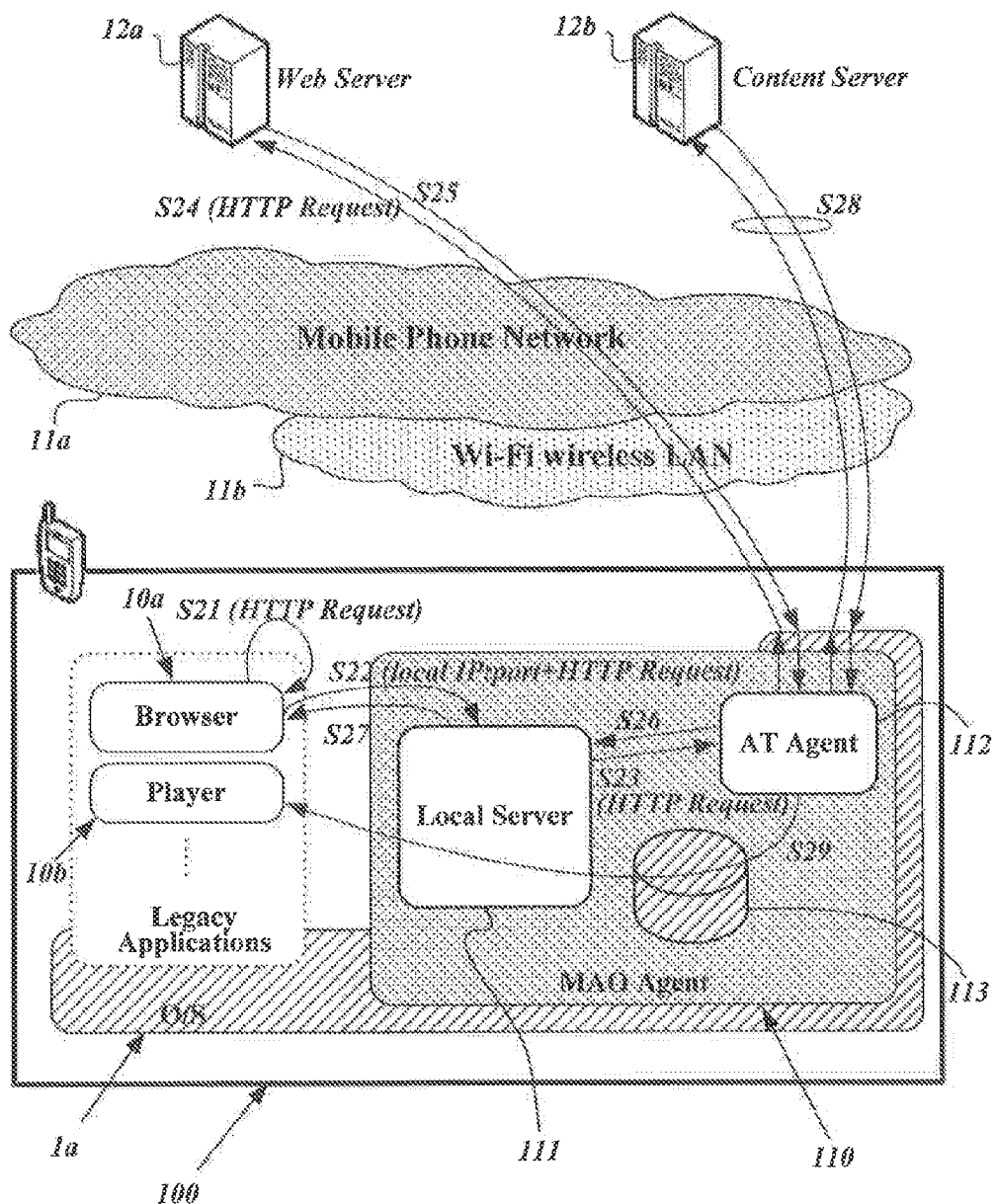
FIG. 2 illustrates a logical configuration, from program's perspective, of a mobile communication terminal according to the present invention implementing a method which enables data communication by using a fixed local host and selectively accessing to a plurality of heterogeneous networks, and its external connections to outside servers.

FIG. 2 illustrates a logical configuration, from program's perspective, of a mobile communication terminal (hereinafter, called "mobile terminal") implementing a method according to an embodiment of the present invention, which enables data communication by using a fixed local host and by selectively using a plurality of heterogeneous wireless networks, and its external connections to outside servers.

With reference to FIG. 2, the mobile terminal 100 is equipped with an operating system (OS) that operates its hardware resources (shown in FIG. 3) and controls exchange of signal and/or data between the hardware resources; programs running on the OS including a web browser 10a and a player 10b, and a multiple-access processing unit (hereinafter, called "MAPU") that, according to an embodiment of the present invention, enables to send and receive data by selectively using a plurality of heterogeneous networks and using a local socket with a fixed local address. The OS may be either a commercial OS (For example, Android, iOS, etc.) or a specialized OS 100a, which is dedicated to the embodiments of the present invention. Of course, the mobile terminal 100 may be equipped with other programs (referred to as apps hereinafter) than the browser and player, but not described as they are nothing to do with the present invention.

As shown in FIG. 2, a multiple access optimization agent (hereinafter, called "MAOA") 110 may be implemented as the MAPU in the form of software such as a process or an app that runs on the OS 100a in the mobile terminal 100. Alternatively, the MAOA may be implemented as a middleware or software platform of the mobile terminal. In another case, the functions of the MAPU may be, in part, implemented in the hardware. Therefore, while the MAPU named MAOA in this specification will be described in the context of the following embodiments of the invention, mainly from viewpoint of software implementation, it is not meant to be limiting as the MAPU can be also in part implemented in hardware.

Figure 3:
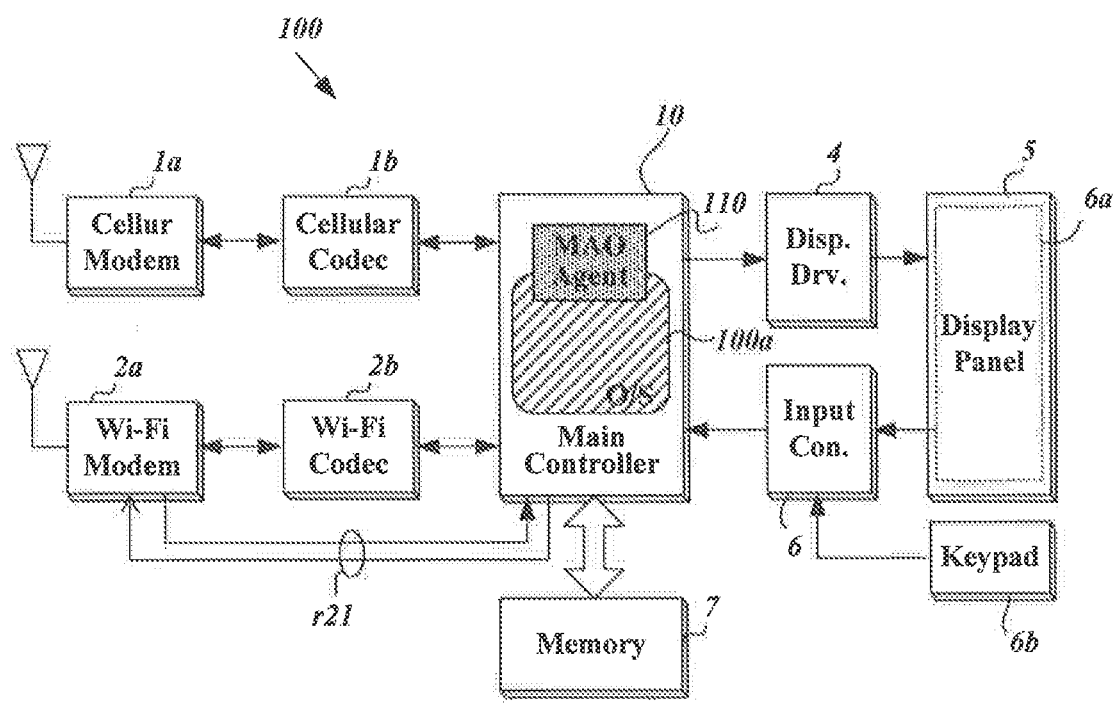
FIG. 3 illustrates a block diagram of a mobile communication terminal implementing a method according to the present invention, which enables data communication by using a fixed local host and selectively accessing to a plurality of heterogeneous networks.

The mobile terminal 100 includes the hardware components illustrated in FIG. 3, being capable of accessing to both a cellular phone network and a high-speed wireless data network. Examples of the mobile terminal are smart phone, tablet computer, and notebook. By referring to FIG. 3, the mobile terminal 100 comprises a cellular modem 1a (including RF signal processing module) that modulates and demodulates signals in a predetermined manner to transmit/receive data over a cellular phone network such as 2G or 3G network; a cellular codec 1b that encodes and decodes data in accordance with a communication protocol of the cellular phone network; a Wi-Fi modem 2a (including RF signal processing module) that modulates and demodulates signals to transmit/receive data over a high-speed data network such as Wi-Fi network; a Wi-Fi codec 2b that encodes and decodes data in accordance with a communication protocol of the data network; a display panel 5 that displays text, image, or video; a display driver 4 that controls the panel to represent data on the panel visually; a touch sensor 6a being attached to the rear face of the panel; a keypad 6b consisting of keys and/or buttons; an input controller 6 that receives the input and/or selection a user enters through the touch sensor and the keypad and generates data associated with the input and/or selection; a main controller 10 that controls all of the components to perform operations accordingly, to make outputs in response to the input and/or selection by a user, and to display the outputs or an UI menu screen on the panel; and a memory 7 that offers a storage required for the operation of the main controller.

In addition to the instructions of the OS 100a, the main controller 10 executes all or part of the instructions of the MAOA 110 so that the operations of the MAOA 110 described below are performed properly. Apps including the MAOA 110 use application program interface (API) functions provided by the OS 100a to make necessary operations such as interprocess communication.

A configuration of the mobile terminal 100 shown in FIG. 3 is selected for illustration only for specific description of the present invention, and not for limitation of the present invention. The mobile terminal 100 may further comprise other components than those of FIG. 3 or may consist of part of them.

According to an embodiment of the present invention, the MAOA 110 consists of an inward processing unit of a local server 111, an outward processing unit of an adaptive transceiving agent 112, and a buffer 113 in memory 7 that stores transceiving data and computation data. The local server 111 and the adaptive transceiving agent 112 are implemented as sub-processes. The local server 111 communicates data with internal processes and the adaptive transceiving agent 112 through a socket that is designated by a socket address, or the combination of a local IP address and a port number, commonly 8080. The adaptive transceiving agent 112 determines which networks are currently accessible among a plurality of heterogeneous networks 11a, 11b and so forth by asking the OS 100a, and communicates with servers outside by adaptively using an access addresses, e.g., IP addresses allocated from a single network or a plurality of networks.

With reference to the configuration of MAOA 110 in FIG. 2, a procedure of data communication in the mobile terminal 100 is now described below in detail.

First, a user activates a communication proxy through a user interface (UI), provided either by the mobile terminal 100 itself or by the browser 10a in response to user's input via an I/O unit (display panel 5, touch sensor 6a, or keypad 6b), and then the proxy is assigned, by the user, a specific IP address publicly known as identifying an internal entity (hereinafter, such an IP address is called "local address" or "internal address") with a port number. Commonly the internal address is "172.0.0.1" or "local host". The port number must be the same as that of the local server 111. The proxy address, e.g., "127.0.0.1:8080" or "localhost:8080" is sent to the OS 100a or the browser 10a so that the proxy is finally activated.

In another embodiment of the invention, in the case that the MAOA 110 is implemented as executable instructions only with no hardware support, the proxy setup may be done automatically at the time that an app, downloaded from a remote server, is installed or starts to run on the mobile terminal 100 after installation. The remote server has a variety of apps specific for the mobile terminals and, when receiving a request to send a particular app, provides the mobile terminals with the app. On the other hand, instead of automatic execution after downloaded, the proxy setup may be performed upon user's request as the app has been temporarily saved in the memory 7. In the case that the local server 111 and the adaptive transceiving agent 112 are implemented as two separate processes, the proxy setup may be carried out by one of the two. The MAOA 110, immediately after running or in running, checks if the proxy setup is made correctly or changes, or the proxy is deactivated and, when the event happens, notifies a user of the event, with a notification symbol, e.g., indicating that network connection by using a plurality of heterogeneous networks cannot be maintained.

Once the proxy setup has been established in the OS 100a or the browser 10a, all requests to access to the network are sent to and processed by the local server 111, which is described below in detail.

Figure 4:
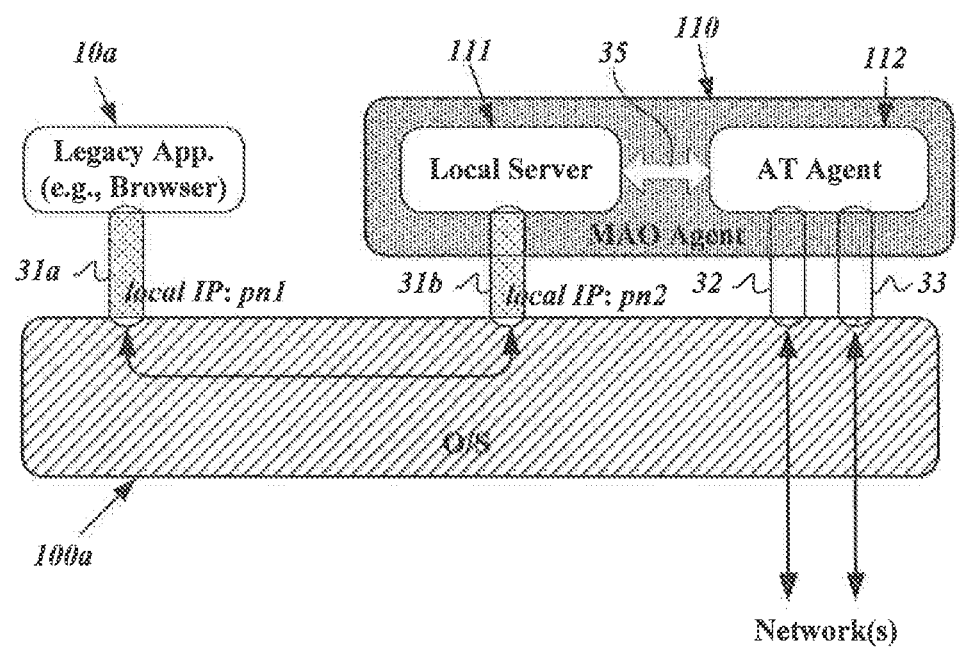
FIG. 4 illustrates sockets created for interprocess communication, according to an embodiment of the present invention.

When a user enters or chooses a URL on a remote server in network outside (S20), e.g., "videomenu.airplug.com", the browser 10a checks a proxy setting and then attempts to create a socket with the proxy setting to send an HTTP request for the URL. In general, to create a socket, it is required to find out the destination address of a server to which HTTP request is sent by communication with a domain name system (DNS) server. However, in this case, the browser 10a, being aware that a proxy has been established in the step of S21, sends, to the OS 100a, a request to create a socket with the same local address and port number as those of the proxy. Then, the OS 100a recognizes that the request is for creating a socket for internal communication (hereinafter, called "local socket") and looks for a process or app to which the port number has been assigned. Because the local server 111 has the same port number as the proxy, as shown in FIG. 4, the OS 100a creates a local socket 31a through which the browser 10a communicates with the local server111 and then returns the identifier of the local socket to the browser 10a. The source address of the local socket is also set to an local address with a unique port number (pnl in FIG. 4). The source and destination addresses of the browser's socket 31a are identical to the destination and source addresses of the local server's socket 31b, respectively.

Figure 5:
FIG. 5 illustrates an interprocess communication format for transferring an HTTP request/response, according to an embodiment of the present invention.

Upon the socket identifier is received, the browser 10a requests the OS 100a to send the HTTP request issued by the browser 10a. The HTTP request is transferred by the OS 100a to the local server 111 through the socket pair 31a and 31b (S22). At that time, the HTTP request of "http:/videomenu.airplug.com", sent to the local server 111 via inter-process communication, may be represented in various formats, depending on a predetermined format specified by the OS 100a. In accordance with the standard protocol layer, as shown in FIG. 5, the local address and port number (hereinafter, term "local address" is referred to as local address plus port number) of the HTTP request may be contained in IP header 41 in the IP packet format. The local server 111 sends the HTTP request to the adaptive transceiving agent 112 by using appropriate communication means 35 such as global variables, shared memory, or calling a global function (S23). If auxiliary header was added to the HTTP request by the OS 100a, the header added is removed before the HTTP request is transferred to the adaptive transceiving agent 112.

In another embodiment of the present invention, the local server 111, which is corresponding to an inward processing unit, and the adaptive transceiving agent 112, which is corresponding to an outward processing unit, can be implemented as a single process. In this case, data or information exchange between the local server 111 and the adaptive transceiving agent 112 is carried out through local variables or parameters of local functions and/or return values. Accordingly, it should be noted that the concept, the main subject, and the efficacy of the present invention are not based on the premise that the local server 111 and the adaptive transceiving agent 112 are separate processes. Hence, their functions, described below in detail, can be achieved necessarily although they are implemented as a single process.

Receiving the HTTP request, the adaptive transceiving agent 112 inquires of the OS 100a about the current network connection and confirms the networks available before executing the operation of selectively using a plurality of networks. If connected to a network, information of the network connection includes an IP address, as an access address, and connection type such as 3G wireless network or Wi-Fi wireless LAN. Here, the phrase "selectively using a plurality of heterogeneous networks" means and refers to the operation that, in cases where a single access address, e.g., IP address is available currently because there has been a single network nearby connectible or because a single IP address has been provided intentionally, although there have been more than one networks accessible, by either the OS 100a or a process determining which network to use, a socket is created with its source address set to the single IP address, and in cases where a plurality of access addresses, e.g., IP addresses are available, each corresponding to each of the plurality of heterogeneous networks connected currently, a single (or more) IP address is chosen among them and a socket is created with its source address set to the chosen IP address. The IP address to use as source address is called "source IP address". The request of socket creation is sent to the OS 100a, with its destination address set to an IP address that is received from a DNS server after name resolution of the remote server specified in the HTTP request, e.g., "videomenu.airplug.com". Alternatively, the request of socket creation can be transferred, with the HTTP request as an argument and then the destination address can be determined by the OS 100a. In response to the request, through the network associated with the source IP address, the OS 100a establishes session, or socket-to-socket virtual connection with the server corresponding to the destination address in the HTTP request (for the sake of explanation on embodiments, the server refers to a web server 12a in accompanying drawings). Once the session is established, in response to the request of the socket creation, the OS 100a returns the identifier of the socket created 32 to the adaptive transceiving agent 112. The socket created is called "outward socket" to distinguish it from the local socket pair 31a and 31b.

By using the socket identifier returned, the adaptive transceiving agent 112 sends the HTTP request to the OS 100a so that the HTTP request is sent to the web server 12a through one of the heterogeneous networks 11a and 11b shown in FIG. 2 (S24). If a cellular phone network 11a is used, IP packets containing the HTTP request are encoded and modulated sequentially by the cellular codec 1b and the cellular modem 1a and are then sent to the server. When a Wi-Fi network is employed, the IP packets are encoded and modulated sequentially by the Wi-Fi codec 2b and Wi-Fi modem 2a before they are transmitted.

On the other hand, before sending the HTTP request to the OS 100a, the adaptive transceiving agent 112 may modify the original HTTP request or create a new single (or more) HTTP request based on the original HTTP request (or a response to redirect the original HTTP request), which is described later in detail with concrete illustrations.

Upon reception of the HTTP request, the web server 12a sends an HTTP response, for example, a web page to the mobile terminal 100 (S25). The web page is received by the OS 100a and is then sent to the adaptive transceiving agent 112 through the outward socket 32, specified by the socket identifier created. The adaptive transceiving agent 112 transfers the web page through the aforementioned proper communication means 35 to the local server 111 (S26), where the web page is sent via the socket pair 31a, 31b to the browser 10a (S27).

By making requests to the OS 100a, the browser 10a displays the web page on the display panel 5 through the display driver 4. If a content item is selected or entered by a user from the web page, for example, a video content, via the input controller 6, the browser 10a sends, through the socket 31a to the local server 111, an HTTP request to send the selected item, e.g., "vod.airplug.com/video/example.mp4". It should be noted that, although the destination address of the HTTP request is different from that of the preceding HTTP request (in the step of S20), e.g., "videomenu.airplug.com", the existing local socket 31a is used without creation of a new socket because the proxy is already configured and the proxy address is set to the fixed local address. Alternatively, another new local socket may be created and used.

Receiving the HTTP request, the local server 111 sends the HTTP request to the adaptive transceiving agent 112 through the proper communication means 35. The adaptive transceiving agent 112 checks if the destination address of the HTTP request is the same as that of the already-created outward socket. If not the same, then a request is sent to the OS 100a to create a new outward socket. After a new socket 33 is created successfully with its destination address set correctly, the HTTP request is sent through the new outward socket to the OS 100a. In response to the HTTP request, the adaptive transceiving agent 112 receives an HTTP response, e.g., a video stream corresponding to the selected item (S28).

Alternatively, even in the case that there already exists a session whose destination address is the same as that of the HTTP request received previously, according to a predetermined condition, the adaptive transceiving agent 112 may send, to the OS 100a, a request to create another new outward socket with a source IP address, which has been already assigned from a different network from the network on which the existing session is established. This is to selectively use more than one heterogeneous networks available.

In the case that, for a single local socket, two or more outward sockets are created, the MAOA 110 creates and maintains a mapping between the local socket (31b in FIG. 4) to the outward sockets firsthand or creates more than one process in full charge of maintaining the mapping between the local socket and the outward sockets. The same mapping operation is also applicable to the case of a plurality of local sockets and a single common outward socket. There are several possible configurations. A single process can be created that builds a mapping from the local socket and the plurality of outward sockets, or a plurality of processes can be created, each maintaining the one-to-one mapping between the local socket and each of the plurality of outward sockets. Even in the case that both the local socket and the outward socket are plural in number, possible mappings between them can be assigned to two or more processes in a similar way. For example, when there are N local sockets and M outward sockets (N, M>=2), a single process may take charge of N-to-M mapping, N processes, each for 1-to-M mapping, or N*M processes, each for the one-to-one mapping.

Meanwhile, as HTTP response from the web server 12a, the content is received by the adaptive transceiving agent 112, in download or streaming mode, through one of the outward sockets 32 or 33 and is then sent, via the buffer 113 when necessary or directly, to the local server 111. Then, the content is transferred to and used by an app, supposed to be invoked upon reception of the content, e.g., video player (S29).

Figure 6:
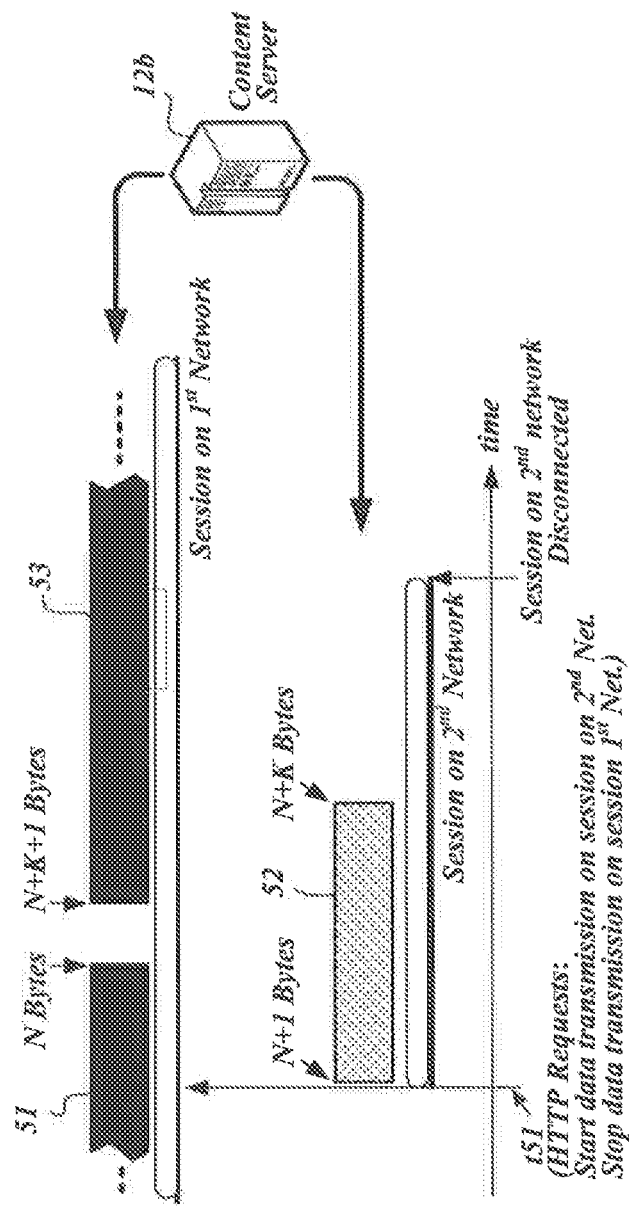
FIGS. 6 and 7 illustrate how an HTTP request is sent through a plurality of networks and how an HTTP response, in response to the HTTP request, is received evenly through the plurality of networks, according to an embodiment of the present invention.
Figure 7:
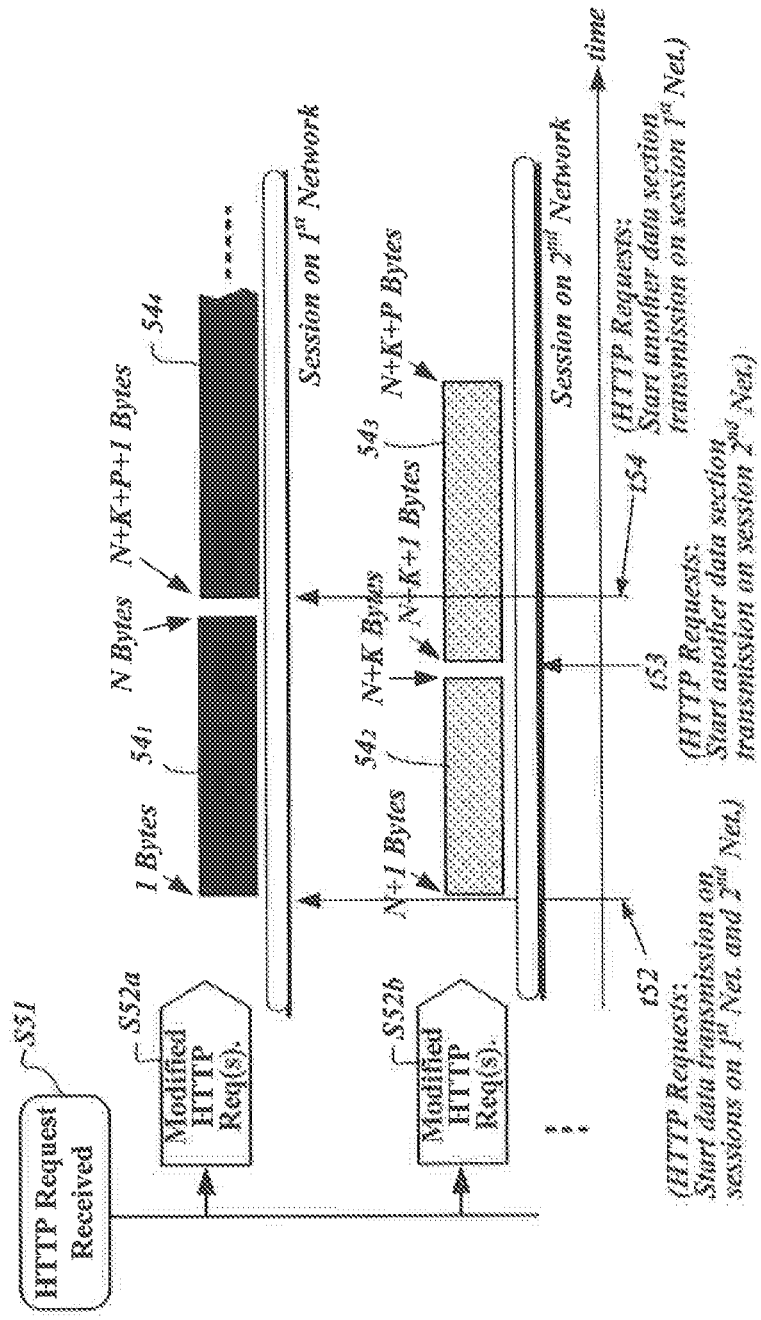

To receive efficiently the content data, in streaming or download mode, through sessions established on the plurality of separate heterogeneous networks, it requires that the adaptive transceiving agent 112 divides the content data into distinct sections, creates and sends, through each of the plurality of sessions, an HTTP request to send each section of the data, and organizes part of the data contained in each HTTP response accordingly. FIGS. 6 and 7 are illustrations for explanation of how to handle this case. FIG. 6 illustrates the case that another network is used additionally while the data is being received via a single network. FIG. 7 illustrates the case that a plurality of networks are used when the request is initially made to send the content data.

Referring to FIG. 6, while receiving data through the session on a first network, e.g., cellular phone network 11a, the adaptive transceiving agent 112 determines that the data needs to be received through connection to another separate network. If it is possible, a session on a second network, e.g., Wi-Fi network 11b, is established by creating an outward socket with a source IP address assigned from the second network. Then, the adaptive transceiving agent 112 designates an section of the data 52, for example, from 'N+1'-th to 'N+K'-th bytes in FIG. 6, and sends, through the established session, an HTTP request to send the section of data to the content server 12b (t51). On the other hand, the adaptive transceiving agent 112 sends, through the session on outward socket on the first network to the content server 12b, an HTTP request to stop sending the data 51 after the specific point in data, for example, the 'N'-th byte, and another HTTP request to send an section of the data 53 behind the designated section of data, that is, from the point in data, for example, the 'N+K+1'-th byte. In responses to the HTTP requests, the content data is received, from the content server 12b, through the separate paths established on separate networks.

In another embodiment of the present invention, the HTTP request to stop sending the data after the specified point in data, e.g., 'N'-th byte, may not be sent. Instead, it is checked if the current point in the data being received through the session on the first network reaches the specified point in data, and if the specified point in data is detected, a request to close the outward socket on the first network is sent to the OS 100a. In a case where it is confirmed that the current point in the data being received is already behind the specified point in data, the outward socket on the first network is closed in the same way, and the data after the specific point in data is discarded in organization of the data. Once a request to close the session is received, the OS 100a releases the resource allocated to the outward socket, thereby closing the session with the content server 12b.

With reference to FIG. 7, the procedure of using a plurality of networks initially is described below in detail. When receiving, through the local socket 31b from the local server 111, an HTTP request S51 to send a content data, the adaptive transceiving agent 112 determines if two or more networks are available and, if possible, it is appropriate to receive the data through multiple connections to the plurality of networks. If it is determined that multiple connections are desirable, the adaptive transceiving agent 112 attempts to create an outward socket and establish a session with the content server on each of the plurality of networks. Then, the adaptive transceiving agent 112 divides the data, specified in the original HTTP request, into distinct sections of data, and sends HTTP requests to send the sections of data S52a, S52b, through each session on the plurality of networks (t52). In responses to the HTTP requests, the sections of the data are received, through a plurality of distinct networks, from the content server and are then organized accordingly.

In the illustration of FIG. 7, the whole data, requested originally by the original HTTP request S51, is initially divided into the first section 541, ranging from 1-th to 'N'-th bytes and the second section 542, ranging from 'N+1'-th to 'N+K'-th bytes. Then, an HTTP request to send the first section of data 541 is composed and sent through the outward socket on a first network, e.g., cellular phone network, and on the other hand, another HTTP request to send the second section of data 542 is composed and sent through the outward socket on a second network, e.g., Wi-Fi network. The HTTP requests are made by modifying information about an object demanded by the original HTTP request or are newly drawn with reference to the information about the demanded object. Upon reception of the second section of data 542, another HTTP request to send another section of data 543, ranging from 'N+K+1'-th to 'N+K+P'-th bytes, behind the section of data 542 is composed and sent through the second network, which is still connected (t53). Once reception of the first section of data 541 is completed, another HTTP request to send another section of data 544, ranging from 'N+K+P+1'-th byte to the end, behind the section of data 541 is composed and sent via the first network (t54). Note that two networks in FIG. 7 are just for illustration only, and the concept and principle of dividing the whole data into distinct sections and requesting to send each section of the data can be implemented readily even with three or more networks in various ways.

For each HTTP request, the adaptive transceiving agent 112 builds a socket link list that contains which outward socket is used to send the HTTP request as well as the corresponding section of the data. Referring to the socket link list, the adaptive transceiving agent 112 organizes the HTTP responses, received through outward sockets on the plurality of networks, in such a way that parts of the data are merged into the whole data accordingly. Then, the whole data is transferred to the local server 111 by which the data is sent to an app, e.g. video player 10b through the local socket corresponding to the outward sockets. For example, by referring to FIG. 4, the HTTP responses are received through the two outward sockets, 32 and 33, created on the two separate networks, organized in their original order, and transferred through the pair of local sockets, 31a and 31b, to a legacy app. The HTTP responses for parts of the data are stored temporarily in the buffer 113 before the response corresponding to the original HTTP request is completed.

While the adaptive transceiving agent 112 maintains the multiple connections to one or more networks via multiple access IP addresses, disconnection to one of the networks may happen due to deterioration of communication conditions or when intentionally attempting to establish connection to another network while closing session to the current network. In either case, the OS 100a generates an event indicating that a network is disconnected and sends the event to all running processes including the MAOA 110. However, because a local address has been used to create a socket on a request from a running process according to the present invention, source addresses of such created sockets are different from an IP address allocated from the disconnected network. Thus, the generated event is discarded by the running process (Even, there are some apps that just discard the event without checking if an IP address of a socket is the same as that for the disconnected network), and the running process keeps waiting for receiving data or trying to send data through the socket with local address. In general, if processes, whose HTTP requests were sent via an outward socket, do not receive HTTP responses, they are usually suspended during a predetermined period of time. On the other hand, in embodiments of the present invention, because processes, such as browser 10a and video player 10b, receive/send data through a local socket, not through an outward socket, the processes are not directly affected by the network disconnection or connection switching between networks, as long as the MAOA 110 maintains the local socket connection irrespective of the network disconnection. To accomplish this, once network disconnection is recognized, the adaptive transceiving agent 112 checks if there are outward sockets which is no longer valid due to the network disconnection. If found, the MAOA 110 sends to the OS 100a a request to create a new outward socket on one of the networks connected currently, by using the destination address of the outward socket closed and stopped being used from the network disconnection. When the identifier of the new outward socket is returned in response, the adaptive transceiving agent 112 updates the socket link list so that the local socket, linked to the closed outward socket, is now linked to the newly-created outward socket, as described in detail above. Also, if there have been an HTTP request sent through the closed outward socket, the HTTP request is sent again through the newly-created outward socket. In this way, even if network disconnection occurs after an HTTP request was sent through usage-stopped socket on the disconnected network, the HTTP response corresponding to the HTTP request can be received through another network accordingly so that the HTTP response is transferred through the local socket to the process issuing the HTTP request. Resultantly, the process is never suspended due to network disconnection.

Meanwhile, in order to resend HTTP requests that was sent through the broken outward socket, the adaptive transceiving agent 112 builds a queue of HTTP requests together with information on the outward sockets through which they were sent. Once an HTTP response is received, the adaptive transceiving agent 112 dequeues the HTTP request corresponding to the HTTP response.

In another embodiment of the present invention, in case of the outward socket close event, instead of just resending an HTTP request as it is, a new HTTP request may be created and sent by modifying the original HTTP request by referring to, if any, the HTTP response that was partially received through the outward socket until before the outward socket is closed. For example, if an HTTP request to send a large-sized file was sent and, in response, the file has been received from its beginning to the 'N'-th byte immediately before the outward socket was closed, the adaptive transceiving agent 112 makes an HTTP request to send the file from the 'N+1'-th byte by modifying the original HTTP request and then sends the new HTTP request through the newly-created outward socket. Once an HTTP response is received in response to the new HTTP request, both the HTTP response and the old HTTP response partially received through the closed outward socket, are merged into a complete HTTP response before it is transferred to the local server 111.

The method of resending HTTP requests through a newly-created outward socket in the case that an outward socket is closed, can be applicable to the case that the OS 100a does not notify the adaptive transceiving agent 112 that a source IP address is no longer valid due to network disconnection. For example, when the response is very slow from the outward socket used currently, when the amount of data received per second, e.g. bps rate is too low, or when another network connectible, which is better in terms of charge, is found, the outward socket on the network used currently is closed intentionally and then a new outward socket is created on another network. All subsequent HTTP requests and responses are sent and received through the newly-created socket.

According to the above descriptions, apps or processes on the mobile terminal can send to and receive data from the local server 111 stably by utilizing a fixed host address, i.e., local address, irrespective of which network the mobile terminal is connected to or which network to use communication. In other words, by enabling the MAOA 110 to switch the connection between networks based on the current communication condition, and to use multiple connections when another network is available and some conditions are met, as long as local sockets with fixed local address are maintained valid, apps installed in the mobile terminal are able to communicate with a remote server smoothly and stably regardless of the status of network connected.

In the foregoing embodiment, if a large amount of data is received as an HTTP response, the adaptive transceiving agent 112 may attempt to use all or part of the heterogeneous networks available, rather than insisting to use a single connection to one of the plurality of networks. In choosing a network to connect initially, the network that the OS 100a attempts to connect by default is accessed and connection to another network is tried to establish multiple connections when necessary.

Figure 8:
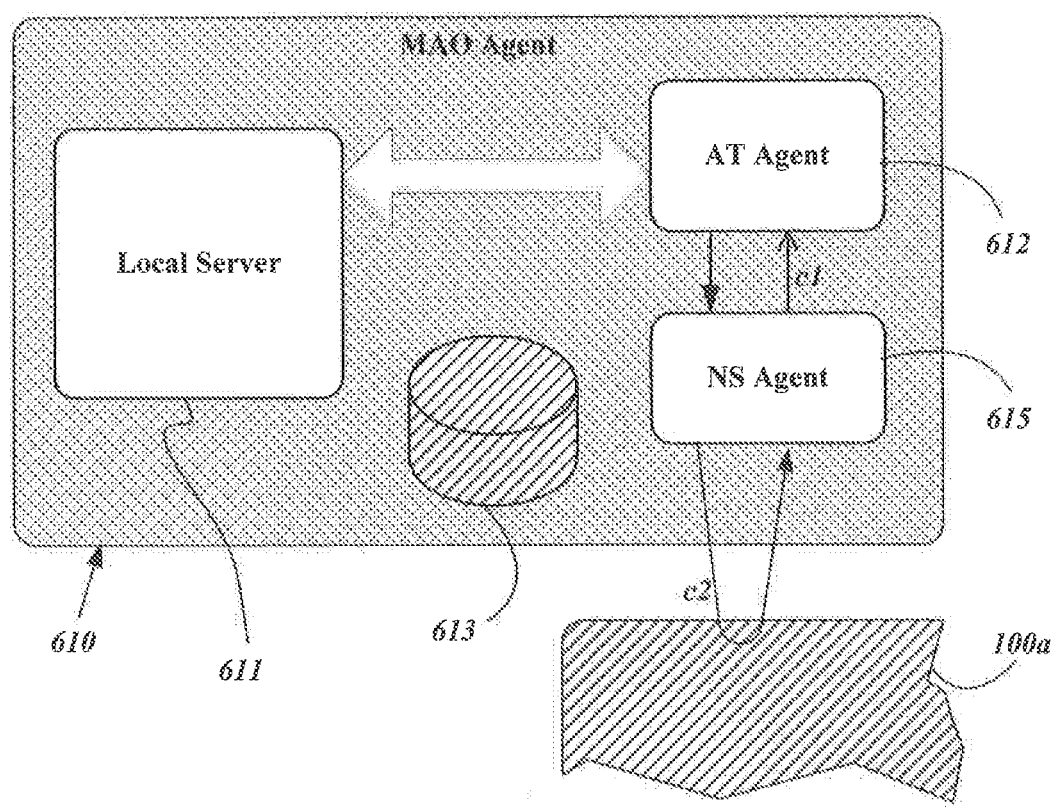
FIG. 8 illustrates a block diagram of multiple connection optimizing agent, according to another embodiment of the present invention.

In another embodiment of the present invention, a decision as to which network to select among a plurality of networks may be made, depending on various conditions and policies. FIG. 8 illustrates a configuration of the MAOA 610 in accordance with this embodiment. As shown in FIG. 8, the MAOA 610 comprises further a network selecting agent (NSA) 615 which, as a sub-process, executes the operation of selecting a network to connect, based on the policy and network conditions such as amount of data, network attributes, and network status. Once a network to connect is chosen (the procedure of selecting a network will be described later), the NSA 615 notifies the adaptive transceiving agent 612 of the network selection event (c1) so that the adaptive transceiving agent 612 specifies the chosen network when requesting the OS 100a to create an outward socket. Later, when sending/receiving data to/from a remote server, the adaptive transceiving agent 612 uses the outward socket established on the chosen network.

The NSA 615 determines a network to use in the light of network attributes available such as the speed of data service, charge policy (free or charged), coverage area, and fluctuation in the quality of service. The method of choosing a network to use is described below specifically.

If it is determined that an HTTP request is for request to send a large amount of data, the NSA 615 selects a high-speed network, e.g., Wi-Fi network and notifies it to the adaptive transceiving agent 612. If an HTTP request is for request to send a small amount of data or to send data in stream mode, not in download mode, a network with relatively a low data transfer speed but wide-area-coverage, e.g., 3G cellular phone network is chosen by the NSA 615 and the adaptive transceiving agent 612 is then notified. The operation of selecting a network to use by the NSA 615 is carried out when it is required to create a new outward socket. Specifically, when receiving an HTTP request from the local server 611, the adaptive transceiving agent 612 examines if the HTTP request needs creation of a new outward socket, and if so, asks the NSA 615 to select a network to use by sending, to the NSA 615, either the HTTP request itself or information based on the HTTP request, before sending a request to create an outward socket to the OS 100a. Of course, even in the case of not creating a new outward socket, the adaptive transceiving agent 612 may ask the NSA 615 to choose a network to use as providing the NSA 615 with a received request or requesting information drawn based on the received request when the request is received.

Alternatively, the NSA 615 may determine a network to use in the light of the current network status available such as the data transfer rate, the received signal strength, and the traffic volume (or network load), which are obtained from inquiries to a server outside. If all of the information above are available, the optimal network is one whose transfer rate is relatively high, received signal strength is strong, and traffic volume is low. To obtain data transfer rate for each of the networks connected, the adaptive transceiving agent 612 calculates the transfer rate by collecting an amount of data received through the outward socket created on each network during a predetermined period of time. The calculated data transfer rate of each network is supplied to the NSA 615, upon request from the NSA 615, or when the adaptive transceiving agent 612 sends either the HTTP request itself or information created based on the HTTP request to create a new outward socket. For the received signal strength, which is available only for Wi-Fi networks, the NSA 615 obtains the received signal strength by sending a request to send it to the OS 100a (c2). The OS 100a reads the received signal strength indicator (RSSI) (r21 in FIG. 3), which is available only when effective signal is detected in the W-Fi spectrum, from the Wi-Fi modem 2a, and then provides the RSSI to the NSA 615. Information about the traffic volume of each network is obtained by sending, through one of the networks connected, request to send it to a central server that maintains the network generally. How to access the central server is predetermined by the NSA 615.

In another embodiment of the present invention, the NSA 615 may determine a network to use based on user's data plan that is chosen at the time of subscription to a cellular phone service. To do this, when the MAOA 610 runs for the first time, the MAOA 610 asks user to enter his/her data plan through user interface provided by the OS 100a, and then sends it to the NSA 615. Information about the data plan asked includes, for example, whether the data plan is unlimited one or has a specific limit (he/she is charged with a rate of, say, $1 per 10 MByte, if user goes over the limit) Instead of directly asking a user to enter, the data plan information may be obtained by sending, by the NSA 615 via the adaptive transceiving agent 612 or for itself, identification information of the user to a maintenance server of the cellular phone network, and by receiving the response from the maintenance server. In case of unlimited data plan, the NSA 615 is supposed to choose a cellular phone network, which has wide coverage-area and little fluctuation in the quality of service, e.g., 3G network. If there is a limit, the NSA 615 selects a 3G network until the limit is reached or gets close to a predetermined threshold, say, 90% of the limit, and, otherwise, chooses a Wi-Fi network that is free of charge. In order to do that, the adaptive transceiving agent 612 accumulates the amount of data, transceived through each of the networks during a predetermined period of time, e.g., a month, and sends it to the NSA 615 on a regular basis.

The criteria described above, which are individually used to select a network to use, such as the network attributes, the network status, and user's data plan, may be used in combination in such a way that the overall score of each network is calculated by summing up the weighted scores on each criterion and the network with the highest score is chosen.

Unlike the foregoing embodiment, where the NSA 615 selects a network to use, according to either an HTTP request or information created from the HTTP request, which is received from the adaptive transceiving agent 612, in another embodiment of the present invention, the NSA 615 itself may determine a network to use adaptively by referring to all above-mentioned information available currently, except information contained in the HTTP request (for example, the content type and the amount of data to request). Then, upon request, the NSA 615 notifies the adaptive transceiving agent 612 of the chosen network. In this embodiment, when an HTTP request is received from the local server 611, the adaptive transceiving agent 612 asks the NSA 615 to report the chosen network, before sending the HTTP request (or an HTTP request created from the original HTTP request) to a server outside. Alternatively, after sending the HTTP request, the adaptive transceiving agent 612 asks the NSA 615 to report the chosen network in order to use the network when sending the subsequent HTTP requests. In this case, the HTTP request is sent through an outward socket on either the default network or the network, which associated with the HTTP request in the socket link list.

In the foregoing embodiments of the present invention, the network chosen by the NSA 615 does not necessarily keep being used but other network may be chosen to be used, on a regular basis, according to varying above-mentioned conditions such as the network attribute and network status. Of course, other network(s) may be additionally used by the adaptive transceiving agent 612 besides the chosen network being used, as aforementioned.

Figure 9:
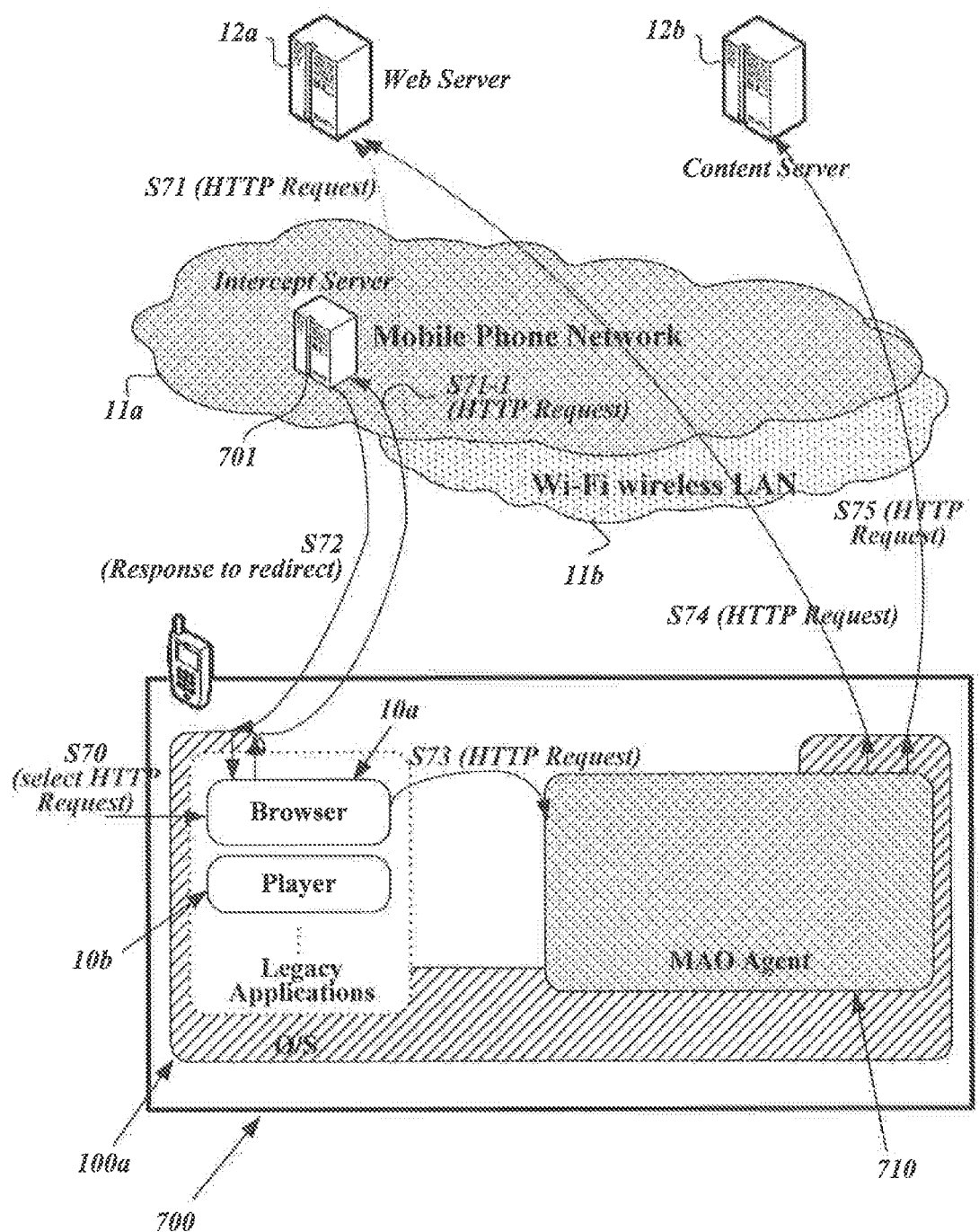
FIG. 9 illustrates a logical configuration of a mobile communication terminal according to another embodiment of the present invention, implementing a method which enables data communication by using a fixed local host and selectively accessing to a plurality of heterogeneous networks.

In the foregoing embodiments of the present invention, by setting a proxy, the requests of data transfer, made by apps or running processes, are all transferred to the MAOA, which is in full charge of dealing with connection to networks so that the apps or processes can communicate data with a remote server stably and smoothly, irrespective of the conditions of network connection. In another embodiment of the present invention, a remote server which intercepts HTTP requests (hereinafter, called "intercept server") is used instead of a proxy inside the mobile terminal 100. FIG. 9 illustrates a logical configuration of a mobile terminal, implementing this embodiment, and its external connections to outside servers. Referring to FIG. 9, the mobile terminal 700 includes a multiple connection optimizing agent (MAOA) 710, which is identical, in terms of its function, to either the MAOA 110 described with reference to FIG. 2 or the MAOA 610 explained with reference to FIG. 8.

The intercept server 701 can be installed either standalone in a cellular communication network 11*a*, which provides the mobile data service to the mobile terminal 700, for example, 3G network, or inside a monitoring server that monitors all of the data transfers inside the communication network 11*a*. The intercept server 701 examines all HTTP requests, transferred through the network 11*a* or all networks that the intercept server 701 administers. If they are HTTP requests to a particular server or HTTP requests to send a large amount of data, the intercept server 701 redirects them. The description below is given on the assumption that HTTP requests from the mobile terminal 700 belong to the class of HTTP requests redirected by the intercept server 701.

When a user chooses a URL on a web server 12*a* via the browser 10*a* (S70), the browser 10*a* asks the OS 100*a* to create a socket in order to send a request in accordance with a predetermined protocol, e.g., an HTTP request. As the destination IP address of the HTTP request is not a local address, a request to create an outward socket is made and sent to the OS 100*a*. An outward socket is created by using a source IP address, which is chosen among IP addresses assigned from the networks connected currently, and its identifier is returned to browser 10*a*, where the HTTP request is then sent through the created outward socket. The HTTP request is sent to the destination or the web server 12*a* (S71), but it is actually delivered to the intercept server 701 (S71-1). Then, by the intercept server 701, an HTTP response with redirect is sent to the mobile terminal 700 (S72). The redirect information specifies a local address (including a port number), which is the same as that already set in the MAOA 710. The redirect information is shared by both the intercept server 701 and the mobile terminal 700 so that they always have the same redirection information. The HTTP response with redirect includes information indicating an object specified in the original HTTP request such as web page and video content. The information is represented by either a URL itself or a modified indicator, which should be able to point to the object uniquely by a local server in the MAOA 710. In order to use the modified indicator, the intercept server 701 and the MAOA 710 should share how to modify the original URL and decode it.

Upon reception of the HTTP response with redirect information, the browser 10*a* makes a new HTTP request to send the object, which is specified in the HTTP response, and then attempts to send the new HTTP request to the local address, specified by the redirect information. To accomplish that, the browser 10*a* requests the OS 100*a* to create a socket with its destination IP address set to the local address. Once the identifier of the local socket is returned, the browser 10*a* sends, through the local socket, the new HTTP request (S73). Once the HTTP request is received, the MAOA 710 sends it to the destination web server 12*a* through an outward socket, which is created by carrying out the same operations as those described in the foregoing embodiments (S74). When another HTTP request is made from a web page, which has been received from the web server 10*a* in response to the HTTP request, the steps of S71, S71-1, S72, S73, and S74 are executed and then the HTTP request is sent to its destination or a content server 12*b* (S75).

Figure 10:
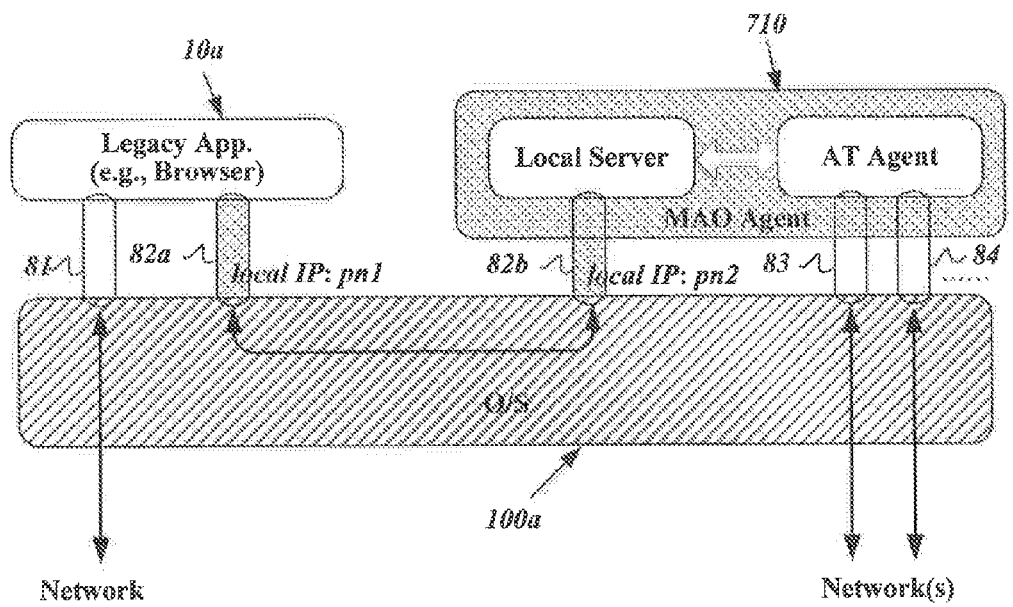
FIG. 10 illustrates sockets created for interprocess communication, according to the embodiment of FIG. 9.

FIG. 10 illustrates a diagram of sockets in a mobile terminal, created to send HTTP requests to a remote server, according to the foregoing embodiment of the present invention. Unlike the embodiments described with reference to FIG. 4, by referring to FIG. 10, once an HTTP request is made by apps such as the browser 10a, an outward socket 81 is created instead of a local socket. Then, in order to send the HTTP request, which is created in response to the HTTP response with redirection directive from the intercept server 701, to the MAOA 710, a pair of the local sockets 82a, 82b is created. Then, for one or more networks connected, one or more outward sockets 83, 84 are created to send the HTTP requests to a remote server through the networks. As shown in FIG. 10, once the sockets are established, by just sending HTTP requests drawn according to a redirection directive through the local sockets 82a, 82b, apps such as the browser 10a can receive the HTTP response ceaselessly, even if it happens that connection to one of the networks is broken or deteriorates in terms of quality, in such a way that the MAOA 710 creates a new connection to another one of the networks, sends HTTP requests to and receives HTTP responses from a remote server through the new connection, and forwards HTTP responses through the local socket 82a.

Moreover, the apps such as browsers can benefit from the multiple connections offered by the MAOA 710, for example, in a manner that a better network connection in terms of speed or charge to use is chosen, with reference to type of HTTP request or network condition.

In another embodiment of the present invention, apps communicating data with a remote server such as browsers send HTTP requests directly through a local socket whose destination address is a local IP address, without referring to a local address set in proxy configuration. To be specific, for every HTTP request sending to a remote server, a browser designed to use the MAOA 110 or 610 in sending HTTP request (hereinafter, called "multiple access-specific (MA-specific) browser") requests the OS 100a to create a socket, whose destination address is a local address, irrespective of the destination IP address of the HTTP request, and then comes to sending the HTTP request to the MAOA 110 or 610 through the local socket. The descriptions on the foregoing embodiments with reference to FIGS. 2 through 8 are all applicable, without modification, to this embodiment, except the description on the proxy.

Figure 11:
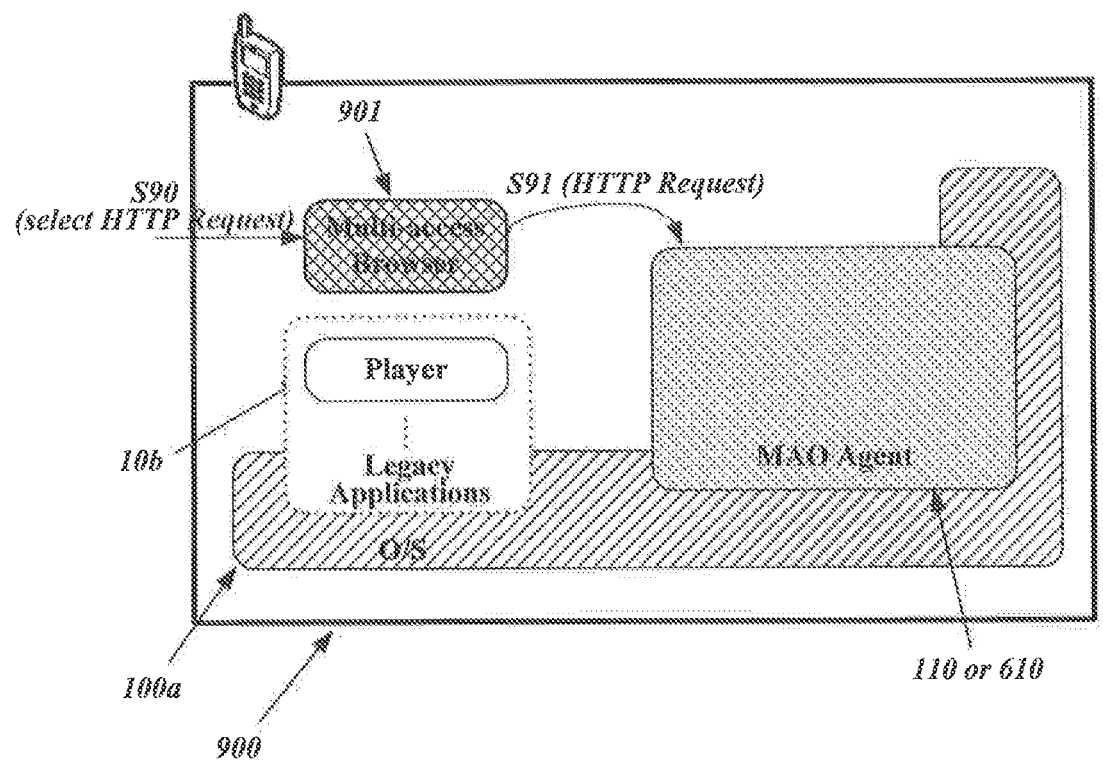
FIG. 11 is a block diagram illustrating a procedure of sending an HTTP request, which is issued by a multiple access-specific application, according to an embodiment of the present invention.

FIG. 11 illustrates a logical configuration of a mobile terminal 900 in which a MA-specific browser 901 is installed. To be specific, by referring to FIG. 11, once a user chooses a URL referring to a page in a remote server (S90), the MA-specific browser 901 requests the OS 100a to create a socket by sending a local address, pre-designated or encoded in instruction level, which is the local IP address and port number, assigned already to the MAOA 110 or 610. In response, the OS 100a creates a local socket and then returns an identifier of the local socket to the MA-specific browser 901. Then, by using the socket identifier, the MA-specific browser 901 sends the HTTP request chosen by user to the MAOA 110 or 610 through the local socket. The subsequent operations are the same as those in the foregoing embodiments described with reference to FIGS. 2 through 8.

Figure 12:
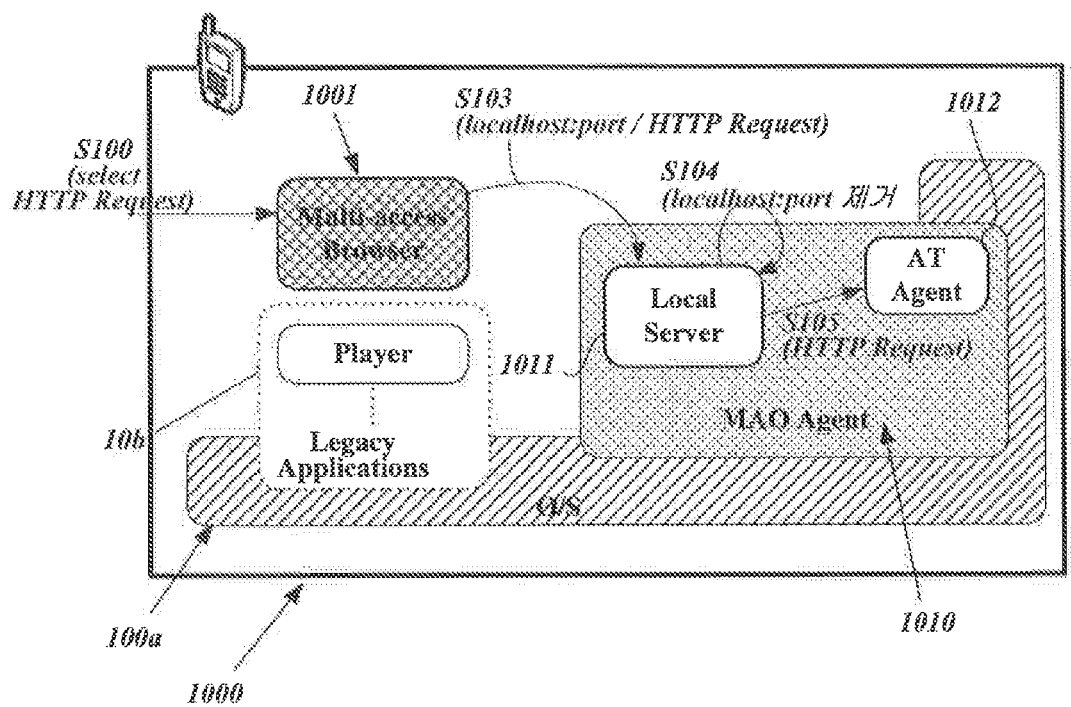
FIG. 12 is a block diagram illustrating a procedure of sending an HTTP request, which is issued by a multiple access-specific application, according to another embodiment of the present invention.
Figure 13:
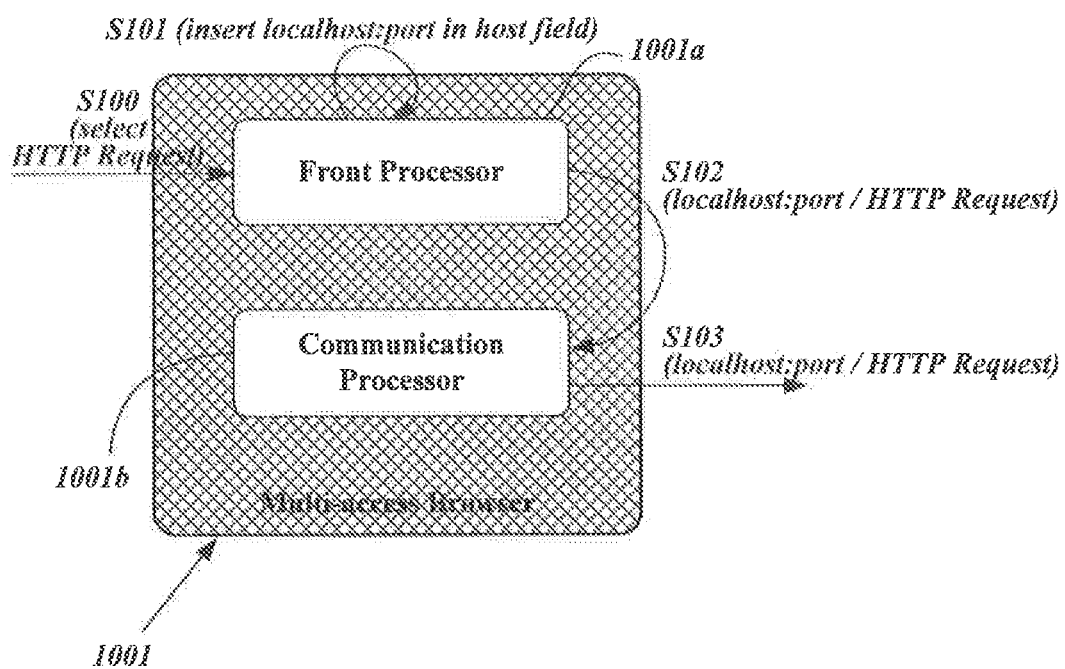
FIG. 13 illustrates a block diagram of a multiple access-specific application and procedure of transferring an HTTP requests inside the multiple access-specific application, according to the embodiment of FIG. 12.

In another embodiment of the present invention, by a MA-specific browser, an HTTP request chosen by user, is modified in such a way that the host field of the HTTP request is replaced by a local address, and is then sent to a MAOA. FIG. 12 illustrates a logical configuration of a mobile terminal 1000 in which the MA-specific browser 1001 and the MAOA 1010 are installed. As shown in FIG. 13, the MA-specific browser 1001 consists of a front-end processor 1001a, which analyzes incoming HTTP requests and executes user interface; and a communication processor 1001b, which communicates with other processes or a remote server. Once a URL, e.g., "videomenu.airplug.com" is chosen or entered by user (S100), the front-end processor 1001a creates a new HTTP request, e.g., "127.0.0.1:8080/videomenu.airplug.com" or "localhost:8080/videomenu.airplug.com", by inserting a local address to the host field of the HTTP request (S101), and then sends the new HTTP request to the communication processor 1001b (S102). When receiving the new HTTP request, the communication processor 1001b requests the OS 100a to create a socket coupled to the MAOA 1010 by setting socket's destination IP address and port number to those extracted from the new HTTP request, e.g., "127.0.0.1:8080" or "localhost:8080". The destination IP address and port number added in the step of S101 are determined in such a way that they are the same as those assigned to the local server 1011 in the MAOA 1010. Therefore, the HTTP request, which is received from the front-end processor 1001a, is sent, through the created socket, to the local server 1011 by the communication processor 1001b (S103).

Figure 14:
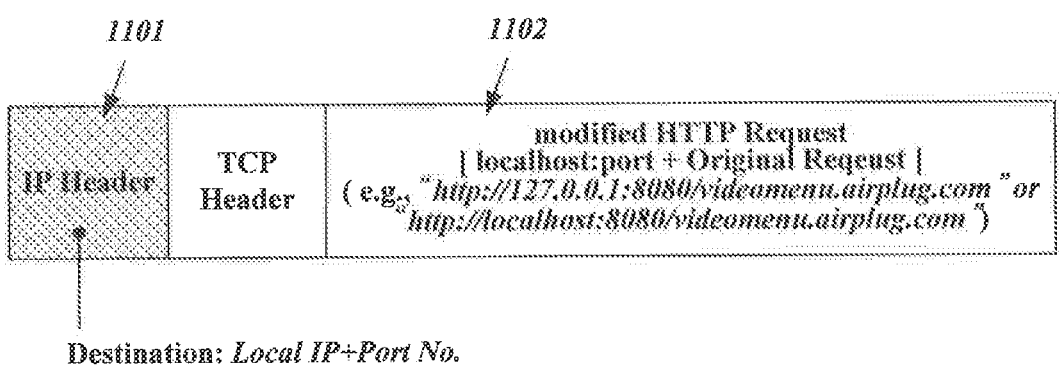
FIG. 14 illustrates an interprocess communication format for transferring an HTTP request/response, according to another embodiment of the present invention.

The HTTP request, which is sent to the local server 1011, e.g., "127.0.0.1:8080/videomenu.airplug.com" or "localhost:8080/videomenu.airplug.com" may be represented in different formats, depending on specification by the OS 100a. In accordance with the standard protocol layer, the HTTP request may be represented in the IP packet format shown in FIG. 14. Compared with the format of FIG. 5, the IP packet body 1102 contains the modified HTTP request including the local IP address and port number.

Upon reception of the modified HTTP request, the local server 1101 makes the original HTTP request by eliminating the local IP address and port number added (S104), and then sends it to the adaptive transceiving agent 1012 (S105) so that the original HTTP request is finally sent to a remote server, to which the user intended to send the original HTTP request, through the same operations as those described in the foregoing embodiments.

In the embodiment described with reference to FIG. 12 and FIG. 13, although not shown for clarity of illustration, the MAOA 1010 may further comprise a buffer which stores HTTP responses temporarily, and also comprise the NSA 615 which selects a network to use in communicating data with a remote server. In case of adoption of the NSA 615, the adaptive transceiving agent 1012 executes the interacting operation with the NSA 615.

In the embodiment described with reference to FIGS. 11 to 14, an HTTP request drawn according to an URL chosen by a user is sent internally, without being transmitted to an external network, to the MAOA through a socket with a local address of fixed address, thus, in the present embodiment, sockets through which an HTTP request is sent are created in the same manner that described with reference to FIG. 4.

In another embodiment of the present invention, which adopts the MA-specific browser, all HTTP requests, which a user chooses or enters in the MS-specific browser, may not be sent to the MAOA (110 or 610 in FIG. 11, or 1010 in FIG. 12). In other words, HTTP requests are sent through a local socket, but in some cases, sent through an outward socket directly without routing via the MAOA. In this embodiment, if the content item, which a user wants to request to send, is a small amount of data, say, a web page, an HTTP request to send the item is sent, through an outward socket, to a remote server. On the other hand, if the item is a large amount of data, an HTTP request is sent, through a local socket, to the MAOA, through the operations described above. Accordingly, in this embodiment, as illustrated in FIG. 10, MA-specific apps like the MA-specific browser may make request to create and use outward socket 81 as well as the local socket 82a.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A wireless terminal, comprising:
    a first processing unit configured to communicate data with an application running on the wireless terminal through at least one local connection interface having a destination address that is set to an internal address; and
    a second processing unit configured to communicate the data with a remote computing system through at least one outward connection interface having (1) a source address that is set to an address associated with one of a plurality of heterogeneous networks and (2) a destination address that is set to a remote address;
    wherein the wireless terminal is configured to communicate data between said at least one local connection interface and said at least one outward connection interface based on an association between such connection interfaces, and
    wherein if access to one network of the plurality of heterogeneous networks is inhibited, the wireless terminal is further configured to create one or more new outward connection interfaces each having (1) a source address that is set to an address associated with a different network of the plurality of heterogeneous networks and (2) a destination address that is set to said remote address.

2. The wireless terminal of claim 1, wherein said local and outward connection interfaces are each implemented as a socket.

3. The wireless terminal of claim 2, wherein the socket is a logical object through which the data is communicated between local processes.

4. The wireless terminal of claim 2, wherein the socket is a logical object through which the data is communicated between a local process and a remote process.

5. The wireless terminal of claim 2, wherein the socket comprises (1) a type of protocol, (2) IP address and port number of a source, and (3) IP address and port number of a destination.

6. The wireless terminal of claim 1, wherein said remote computing system comprises a server.

7. The wireless terminal of claim 1, wherein the first and second processing units are implemented in software.

8. The wireless terminal of claim 1, wherein the first and second processing units are implemented in hardware.

9. The wireless terminal of claim 1, wherein the wireless terminal is configured to create said at least one local connection interface in response to an original request directed to the remote computer system.

10. The wireless terminal of claim 9, wherein the request is compliant with one or more networking protocols.

11. The wireless terminal of claim 9, wherein the wireless terminal is configured to create said at least one local connection interface based on the internal address specified in a configuration set in the wireless terminal, irrespective of any destination address specified in the original request.

12. The wireless terminal of claim 9, wherein the wireless terminal is configured to create said at least one local connection interface based on the internal address specified in a redirection directive, irrespective of any destination address specified in the original request.

13. The wireless terminal of claim 9, wherein the wireless terminal is configured to create said at least one local connection interface based on the internal address specified by the application, irrespective of any destination address specified in the original request.

14. The wireless terminal of claim 13, wherein the wireless terminal is configured so that the application inserts the internal address into a host field of the request, and sends said request containing the internal address to the first processing unit through said at least one local connection interface, and wherein the first processing unit removes the internal address from said request, and sends the internal address to the second processing unit.

15. The wireless terminal of claim 13, wherein the application is configured to send requests selectively according to chosen items to the first processing unit through said at least one local connection interface.

16. The wireless terminal of claim 9, wherein the wireless terminal is further configured to (1) create, in addition to a first outward connection interface created for using a first network of the plurality of heterogeneous networks, a second outward connection interface for using a second network of the plurality of heterogeneous networks; and (2) create a new request for demanding at least a portion of the data intended to be received in connection with the original request.

17. The wireless terminal of claim 16, wherein the wireless terminal is further configured to transmit the new request through the second outward connection interface, while preventing said portion of the data from being received through the first outward connection interface.

18. The wireless terminal of claim 17, wherein the second processing unit is further configured to combine a first data portion contained in a response to the new request with a second data portion already received in connection with the original request.

19. The wireless terminal of claim 18, wherein the second processing unit is further configured to send the combined first and second data portions to the first processing unit.

20. The wireless terminal of claim 17, wherein the wireless terminal is further configured to prevent said portion of the data from being received through the first outward connection interface by transmitting, through the first outward connection interface, a request for not transmitting said portion of the data.

21. The wireless terminal of claim 17, wherein the wireless terminal is further configured to prevent said portion of the data from being received through the first outward connection interface by closing the first outward connection interface.

22. The wireless terminal of claim 9, wherein the wireless terminal is further configured to (1) divide the data intended to be received in connection with the original request into two or more distinct portions, (2) create new requests, each demanding each of the two or more distinct portions, and (3) create a plurality of outward connection interfaces for using two or more networks of the plurality of the heterogeneous networks.

23. The wireless terminal of claim 22, wherein the second processing unit is further configured to combine a first data portion contained in response to one of the new requests with a second data portion contained in response to another of the new requests.

23. The wireless terminal of claim 23, wherein the second processing unit is further configured to send the combined first and second data portions to the first processing unit.

25. The wireless terminal of claim 1, wherein the one or more new outward connection interfaces are each associated with one or more local connection interfaces corresponding to the inhibited network access.

26. The wireless terminal of claim 1, wherein the wireless terminal is further configured to retransmit the original request through the one or more new outward connection interfaces.

27. The wireless terminal of claim 1, wherein the wireless terminal is further configured to transmit through the one or more new outward connection interfaces a new request for demanding at least a portion of the data intended to be received in connection with the original request.

28. The wireless terminal of claim 27, wherein the second processing unit is further configured to combine a first data portion contained in a response to the new request with a second data portion already received in connection with the original request.

29. The wireless terminal of claim 28, wherein the second processing unit is further configured to send the combined first and second data portions to the first processing unit.

30. The wireless terminal of claim 1, further comprising a third processing unit configured to select, among the plurality of heterogeneous networks, one or more networks over which the request received through the local connection interface is to be transmitted, and to notify the second processing unit of the selected one or more networks.

31. The wireless terminal of claim 30, wherein the third processing unit is configured to select the one or more networks based on a user's service charge plan.

32. The wireless terminal of claim 30, wherein the third processing unit is configured to select the one or more networks based on one or more attributes of the one or more networks of the plurality of heterogeneous networks.

33. The wireless terminal of claim 30, wherein the third processing unit is configured to select the one or more networks based on the size of the data intended to be received in connection with the request.

34. The wireless terminal of claim 30, wherein the third processing unit is configured to select the one or more networks based on one or more of the following: (1) user's service charge plan, (2) one or more attributes of the one or more networks of the plurality of heterogeneous networks, and (3) the size of the data intended to be received in connection with the request.

35. The wireless terminal of claim 1, wherein the internal address comprises a port number and a specific IP address that is publicly known as identifying an internal entity.

36. The wireless terminal of claim 1, wherein said association comprises a one-to-one mapping.

37. The wireless terminal of claim 1, wherein said association comprises a one-to-many mapping.

38. The wireless terminal of claim 1, wherein said association comprises a many-to-many mapping.

39. A machine implemented method comprising:
communicating data with an application running on a wireless terminal through at least one local connection interface having a destination address that is set to an internal address;
communicating the data with a remote computing system through at least one outward connection interface having (1) a source address that is set to an address associated with one of a plurality of heterogeneous networks and (2) a destination address that is set to a remote address;
communicating the data between said at least one local connection interface and said at least one outward connection interface based on an association between such connection interfaces; and
creating one or more new outward connection interfaces each having (1) a source address that is set to an address associated with a different network of the plurality of heterogeneous networks and (2) a destination address that is set to said remote address.

40. The method of claim 39, wherein said local and outward connection interfaces are each implemented as a socket.

41. The method of claim 39, further comprising:
creating said at least one local connection interface in response to an original request directed to the remote computer system.

42. The method of claim 41, further comprising:
creating said at least one local connection interface based on the internal address, irrespective of any destination address specified in the original request.

43. The method of claim 39, further comprising:
selecting, among the plurality of heterogeneous networks, one or more networks over which a request received through the local connection interface is to be transmitted, and providing notice of the selected one or more networks.

44. The method of claim 41, further comprising:
creating, in addition to a first outward connection interface created for using a first network of the plurality of heterogeneous networks, a second outward connection interface for using a second network of the plurality of heterogeneous networks; and
creating a new request for demanding at least a portion of the data intended to be received in connection with the original request.

45. The method of claim 41, further comprising:
dividing the data intended to be received in connection with the original request into two or more distinct portions;
creating new requests, each demanding each of the two or more distinct portions; and
creating a plurality of outward connection interfaces for using two or more networks of the plurality of the heterogeneous networks.

46. A data storage device containing instructions which, when executed, cause one or more data processing machines to perform a method comprising:
communicating data with an application running on a wireless terminal through at least one local connection interface having a destination address that is set to an internal address;
communicating the data with a remote computing system through at least one outward connection interface having (1) a source address that is set to an address associated with one of a plurality of heterogeneous networks and (2) a destination address that is set to a remote address;
communicating the data between said at least one local connection interface and said at least one outward connection interface based on an association between such connection interfaces; and
creating one or more new outward connection interfaces each having (1) a source address that is set to an address associated with a different network of the plurality of heterogeneous networks and (2) a destination address that is set to said remote address.

47. The data storage device of claim 46, wherein said local and outward connection interfaces are each implemented as a socket.

48. The data storage device of claim 46, wherein the method further comprises:
creating said at least one local connection interface in response to an original request directed to the remote computer system.

49. The data storage device of claim 48, wherein the method further comprises:
creating said at least one local connection interface based on the internal address, irrespective of any destination address specified in the original request.

50. The data storage device of claim 48, wherein the method further comprises:
creating, in addition to a first outward connection interface created for using a first network of the plurality of heterogeneous networks, a second outward connection interface for using a second network of the plurality of heterogeneous networks; and
creating a new request for demanding at least a portion of the data intended to be received in connection with the original request.

51. The data storage device of claim 48, wherein the method further comprises:
dividing the data intended to be received in connection with the original request into two or more distinct portions;
creating new requests, each demanding each of the two or more distinct portions; and
creating a plurality of outward connection interfaces for using two or more networks of the plurality of the heterogeneous networks.

52. The data storage device of claim 46, wherein the method further comprises:
selecting, among the plurality of heterogeneous networks, one or more networks over which a request received through the local connection interface is to be transmitted, and providing notice of the selected one or more networks.

53. The data storage device of claim 46, wherein the one or more data processing machines are wireless terminals.

54. The data storage device of claim 46, wherein the instructions are downloaded in form of a program to the one or more data processing machines through a wireless network.

* * * * *